United States Patent
Suda et al.

(10) Patent No.: US 7,157,326 B2
(45) Date of Patent: Jan. 2, 2007

(54) PROCESS FOR FABRICATING CAPACITOR ELEMENT

(75) Inventors: Yuichi Suda, Funabashi (JP); Hidenori Kamigawa, Higashiosaka (JP); Eizo Fujii, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 396 days.

(21) Appl. No.: 10/882,665

(22) Filed: Jul. 2, 2004

(65) Prior Publication Data

US 2005/0036272 A1    Feb. 17, 2005

(30) Foreign Application Priority Data

Jul. 10, 2003 (JP) .............................. 2003-273085
Jul. 10, 2003 (JP) .............................. 2003-273089

(51) Int. Cl.
*H01L 21/8242* (2006.01)
(52) U.S. Cl. ............... 438/239; 29/25.03; 361/523
(58) Field of Classification Search ................ 438/238, 438/239, 253, 142, 197
See application file for complete search history.

(56) References Cited

U.S. PATENT DOCUMENTS 5,223,120 A * 6/1993 Kojima et al. ............... 205/317
6,139,592 A * 10/2000 Kamigawa et al. ........ 29/25.03
6,671,168 B1 * 12/2003 Yoshida et al. ............. 361/523
2006/0181836 A1 * 8/2006 Furuzawa et al. .......... 361/523

FOREIGN PATENT DOCUMENTS

JP          11-121280          4/1999

* cited by examiner

*Primary Examiner*—Brook Kebede
*Assistant Examiner*—Su C. Kim
(74) *Attorney, Agent, or Firm*—Armstrong, Krartz, Quintos, Hanson & Brooks, LLP

(57) ABSTRACT

A process of the invention for fabricating a capacitor element includes the steps of forming a dielectric coating on a surface of an anode body and a surface of lower part of a projecting portion of an anode lead member implanted in the anode body, forming a precoat layer of an electrically conductive high polymer on the dielectric coating, exposing an area of the surface of the lower part in an annular form by partly removing the dielectric coating and the precoat layer, forming an electrically conductive high polymer layer on the precoat layer using an electrolytic polymerization process by immersing the anode body in a solution of a monomer so as to position said area of the surface of the lower part at the liquid level of the solution, and deburring the conductive high polymer formed on said area of the surface of the lower part.

16 Claims, 12 Drawing Sheets

PROCESS FOR FABRICATING CAPACITOR ELEMENT

FIELD OF THE INVENTION

The present invention relates to a process for fabricating capacitor elements, and more particularly to a process for fabricating a capacitor element which process includes the step of forming an electrically conductive high polymer layer by electrolytic polymerization.

BACKGROUND ART

Electronic devices such as personal computers and video devices have incorporated therein an electronic circuit which operates in the region of high frequency waves. Solid electrolytic capacitors are excellent in high-frequency characteristics, small-sized and great in capacity and have therefore found wide use in such electronic circuits. Most common solid electrolytic capacitors include a solid electrolytic capacitor 1 of the chip type shown in FIG. 5. The capacitor 1 comprises a capacitor element 2 having the function of a capacitor. The capacitor element 2 is fabricated with a block of anode body 3 serving as a base. Useful as the anode body 3 is a sintered body of a valve metal such as tantalum, niobium, titanium or aluminum. A rodlike anode lead member 4 is implanted in the anode body 3 and has a portion projecting outward from one side of the anode body 3. For example, a wire of tantalum is used as the anode lead member 4.

A very thin dielectric coating 5 is formed over the surface of the anode body 3. The dielectric coating 5 is formed by oxidizing the surface of the anode body 3, for example, by anodic oxidation. An electrically conductive high polymer layer 7 is formed on the dielectric coating 5 by chemical polymerization or electrolytic polymerization. For example, polypyrrole is used for the conductive high polymer layer 7. Further formed over the high polymer layer 7 are a carbon layer 8 and a silver layer 9. An anode terminal 10 in the form of a plate is joined to the anode lead member 4, and a platelike cathode terminal 11 to the silver layer 9. The capacitor element 2 is covered with a packaging resin 12 in a rectangular form. For example, an epoxy resin is used as the packaging resin 12. The anode terminal 10 and the cathode terminal 11 are caused to extend from the packaging resin 12 in opposite directions and bent downward. The outer ends of these terminals 10, 11 are arranged along the bottom surface of the packaging resin 12 and used for soldering the capacitor 1 to a board (not shown) for mounting thereon.

As previously described, the conductive high polymer layer 7 is formed by chemical polymerization or electrolytic polymerization in the process for fabricating the capacitor element 2. For chemical polymerization, a monomer is subjected to oxidation polymerization using an oxidizer to form a conductive high polymer layer 7. Stated more specifically, after the dielectric coating 5 is formed on the anode body 3, an oxidizer is applied to the coating 5 for chemical polymerization. The anode body 3 having the oxidizer applied thereto is immersed in a solution of a monomer, or allowed to stand in an atmosphere of the monomer, whereby the monomer is polymerized on the dielectric coating 5 to form a conductive high polymer layer 7.

The chemical polymerization process has the drawback that the conductive high polymer layer 7 formed is low in strength and uneven in thickness. Presently, the electrolytic polymerization process is in wide use for forming the conductive high polymer layer 7. FIGS. 6A and 6B are diagrams for illustrating a procedure for fabricating a capacitor element 2 using the conventional common electrolytic polymerization process. FIG. 6A shows an anode body 3 having a precoat layer 6 made of an electrically conductive high polymer and covering a dielectric coating 5. The precoat layer 6 is formed by the chemical polymerization process.

After the precoat layer 6 has been formed, an electrically conductive high polymer layer is formed by the electrolytic polymerization process utilizing the precoat layer 6. As shown in FIG. 6B, the anode body 3 is immersed in a solution of the monomer to be polymerized. A vessel containing the solution is provided with an electrode plate 20. When voltage is applied across the precoat layer 6 serving as a positive electrode and the electrode plate 20 serving as a negative electrode, the monomer is subjected to oxidation polymerization to form an electrically conductive high polymer layer over the precoat layer 6.

With the conventional electrolytic polymerization process, the precoat layer 6 is given a positive potential by holding the end of an electrode member 21, which is electrically connected to the positive electrode of a power source, in contact with the precoat layer 6 as shown in FIG. 6B. However, the amount of current flowing through the precoat layer 6 varies with the degree of contact of the electrode member 21 with the precoat layer, so that extreme difficulty is encountered in giving a specified thickness to the conductive high polymer layers of the individual capacitor elements to be fabricated. Furthermore, if the electrode member 21 is moved after the conductive high polymer layer has been formed, a portion of the conductive high polymer layer formed on the anode body 3 frequently adheres to the end of the electrode member 21, as separated from the anode body 3.

JP-A No. 11-121280 discloses a method of solving the above problem. With this method, the precoat layer 6 covering the dielectric coating 5 is so formed as to cover also a projecting portion of the anode lead member 4. Since the precoat layer 6 is electrically connected to the anode lead member 4, a positive potential can be given to the precoat layer 6 by supplying electricity to the anode lead member 4 as shown in FIG. 7B. With this method, a portion of the precoat layer 6 and a portion of the conductive high polymer layer are made into an insulator to electrically separate the anode lead member 4 from the precoat layer 6 and the conductive high polymer layer after the high polymer layer has been formed.

This method nevertheless forms a burr 70 of conductive. high polymer around the anode lead member 4 as shown in FIG. 7C. The burr 70 grows along the liquid level of the solution during electrolytic polymerization and therefore extends in the form of a flange around the lead member 4. When the anode body 3 is immersed in the solution for electrolytic polymerization, a portion of the solution ascends along the anode lead member 4 from the liquid level due to surface tension. The burr 70 includes a portion formed along the lead member 4 owning to the ascent of the solution.

The burr 70 is of course unnecessary and accordingly a deburring step needs to be performed using a file, grinder or the like after the conductive high polymer layer 7 has been formed. However, the shape and size of the burr 70 differ from anode body to anode body. For this reason, the method described encounters the problem that the grinder or the like for removing the burr 70 is difficult and cumbersome to position in place. Another problem also arises in that even a portion which need not be ground is so treated in order to ensure reliable deburring. For example, if the conductive high polymer layer 7 is ground, the capacitor element permits an increased leakage current to impair the performance of the solid electrolytic capacitor.

The present invention, which has been accomplished to solve the foregoing problems, provides a process for fabricating a capacitor element wherein a conductive high polymer layer is formed by electrolytic polymerization by supplying current through an anode lead member, and the anode lead member can thereafter be deburred easily. The invention further provides a process for fabricating a capacitor element wherein a conductive high polymer layer can be formed by electrolytic polymerization by supplying current through an anode lead member without permitting formation of burrs.

SUMMARY OF THE INVENTION

The present invention provides a process of the invention for fabricating a capacitor element which process includes the steps of forming a dielectric coating on a surface of an anode body and a surface of lower part of a projecting portion of an anode lead member implanted in the anode body, forming a precoat layer of an electrically conductive high polymer on the dielectric coating, exposing an area of the surface of the lower part in an annular form by partly removing the dielectric coating and the precoat layer, forming an electrically conductive high polymer layer on the precoat layer using an electrolytic polymerization process by immersing the anode body in a solution of a monomer so as to position said area of the surface of the lower part at the liquid level of the solution, and deburring the conductive high polymer formed on said area of the surface of the lower part. With this fabrication process, the region wherein burrs are formed is restricted to a lateral region around the surface of the lower part. This greatly facilitates the deburring step.

Preferably, an annular precoat layer is provided in the exposing step on an annular dielectric coating formed on the upper side of the above-mentioned area of the surface of the lower part. The annular precoat layer effectively hampers the ascent of the solution during electrolytic polymerization.

Preferably, at least one of the exposing step and the deburring step is performed using a laser beam. When the laser beam is used for both of these steps, the anode body can be disposed in the same position in these steps relative to the laser beam source because the region of burr formation is restricted as described above. Further if the laser beam is used for the deburring step, the anode lead member can be electrically insulated from the precoat layer and the conductive high polymer layer more reliably.

The present invention also provides a process for fabricating a capacitor element including the steps of forming a dielectric coating on a surface of an anode body and a surface of lower part of a projecting portion of an anode lead member implanted in the anode body, forming a precoat layer of an electrically conductive high polymer on the dielectric coating, exposing an area of the surface of the lower part in an annular form by partly removing the dielectric coating and the precoat layer so as to provide an annular dielectric coating, forming an electrically conductive high polymer layer on the precoat layer using an electrolytic polymerization process by immersing the anode body in a solution of a monomer so as to position the annular dielectric coating at the liquid level of the solution, and removing a portion of the conductive high polymer layer formed on said area of the surface of the lower part.

The present invention further provides a process for fabricating a capacitor element including the steps of providing an annular covering member on a surface of lower part of a projecting portion of an anode lead member implanted in an anode body, forming a dielectric coating on a surface of the anode body and forming a dielectric coating on the surface of the lower part of the projecting portion above and under the covering member, forming a precoat layer of an electrically conductive high polymer so as to cover at least the dielectric coating formed on the surface of the anode body, exposing an area of the surface of the lower part of the projecting portion in an annular form by removing the covering member, forming an electrically conductive high polymer layer on the precoat layer using an electrolytic polymerization process by immersing the anode body in a solution of a monomer so that the dielectric coating in an annular form and located above the covering member before the removal thereof is positioned at the liquid level of the solution, and removing a portion of the conductive high polymer layer formed on said area of the surface of the lower part.

With these fabrication processes, the conductive high polymer layer can be formed by electrolytic polymerization without permitting formation of burrs on the anode lead member. With these processes, it is desired to use a laser beam in performing at least one of the exposing step and the deburring step. It is more desirable to use the laser beam in performing these steps.

DETAILED DESCRIPTION OF THE INVENTION

Figure 1A:
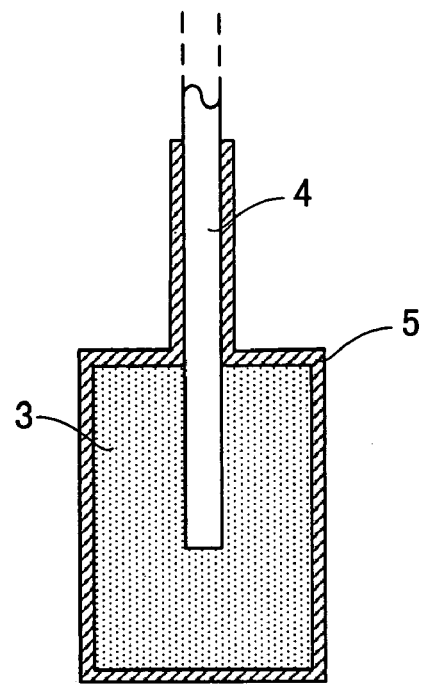
FIG. 1A is a sectional view of an anode body for illustrating as a first embodiment of the invention a process for fabricating a capacitor element, a dielectric coating being formed over the surface of the anode body and over the surface of a lower part of projecting portion of an anode lead member.

Embodiments of the invention, i.e., processes for fabricating solid electrolytic capacitor elements, will be described below with reference to the drawings. Throughout the accompanying drawings, inclusive of those previously referred to, like parts or components are designated by like reference numerals. Incidentally, it is to be noted that the drawings are intended for illustrative purposes only, and that actual sizes or ratios are not always shown therein.

[First Embodiment]

A first embodiment of the invention will be described. First prepared is an anode body 3 in the form of a block and having an anode lead member 4 implanted therein. The anode body 3 has the lead member 4 projecting upward from the approximate center of the top thereof generally perpendicular to the top side. A sintered body of valve metal, for example, a sintered body of tantalum, is used as the anode body 3. A wire of valve metal, e.g., tantalum wire, is used as the anode lead member 4.

As shown in FIG. 1A, a dielectric coating 5 is formed on the surface of the anode body 3. The dielectric coating 5 is formed, for example, by immersing the anode body 3 in an aqueous solution of phosphoric acid and thereafter applying voltage to anodically oxidize the surface of the anode body 3. The dielectric coating 5 is formed also on the anode lead member 4 over the surface of the portion thereof exposed to the aqueous solution of phosphoric acid, i.e., over the surface of lower part of the projecting portion of the lead member 4 (or over the surface of the base end portion).

Figure 1B:
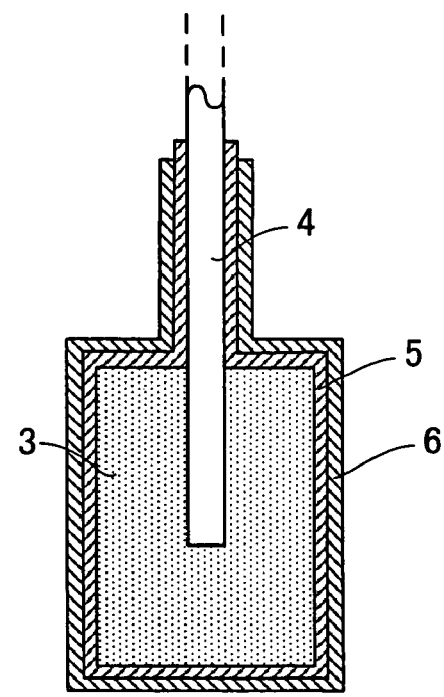
FIG. 1B is a sectional view of the anode body for illustrating the first embodiment of the invention, the dielectric coating having a precoat layer formed thereon.

Next as shown in FIG. 1B, a precoat layer 6 of electrically conductive high polymer is formed. For example, polypyrrole is used for the precoat layer 6. The precoat layer 6 is formed by subjecting the anode body 3, as pretreated, to a chemical oxidation polymerization treatment for polymerizing pyrrole. While the precoat layer 6 is formed so as to cover the dielectric coating 5 formed at least over the surface of the anode body 3, it is desired that the precoat layer 6 be formed over the dielectric coating 5 also on the projecting portion of the anode lead member 4, i.e., so as to nearly cover the dielectric coating 5 as shown in FIG. 1B. The precoat layer 6 is formed as held out of contact with the anode lead member 4.

Performed after the precoat layer 6 has been formed is the step of exposing the surface of lower part of the projecting portion of the anode lead member 4 by partly removing the dielectric layer 5 and the precoat layer 6. The coating 5 and the precoat layer 6 are partly removed so as to expose the surface of the anode lead member 4 in an annular form.

Figure 1C:
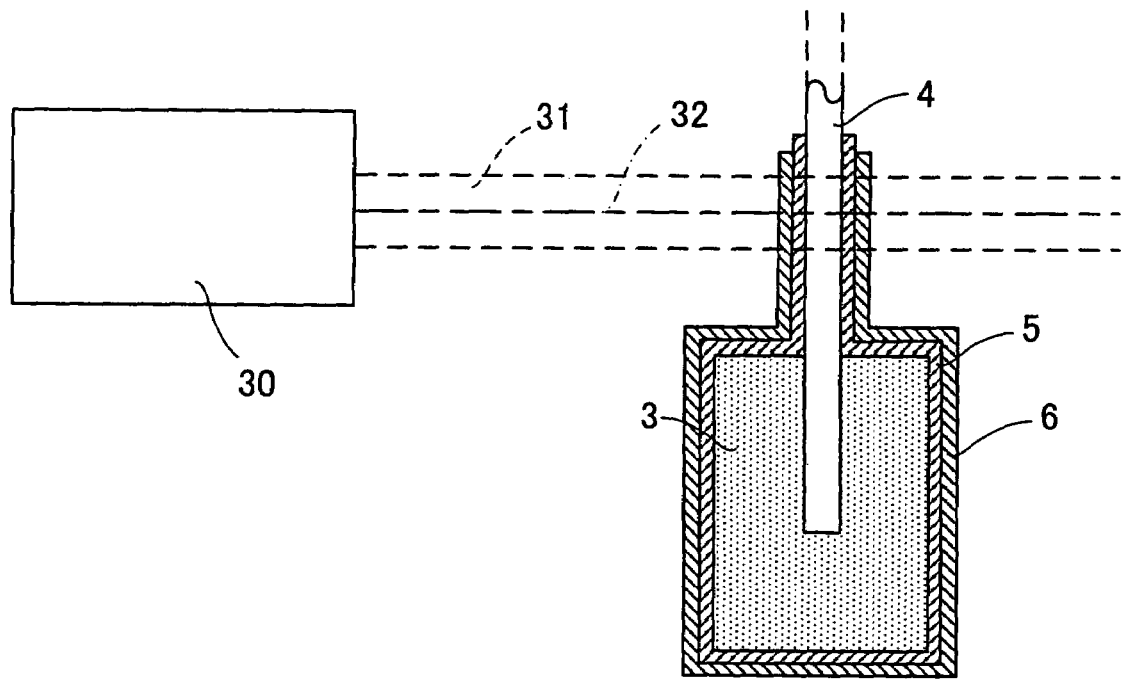
FIG. 1C is a sectional view of the anode body for illustrating the first embodiment of the invention, the view showing the step of partly removing the dielectric coating and the precoat layer with a laser beam.

With reference to FIG. 1C, the dielectric coating 5 and the precoat layer 6 are removed preferably by using a laser beam source 30. The anode lead member 4 is irradiated with a laser beam 31 from the laser beam source 30, whereby the coating 5 and the precoat layer 6 are locally removed from the surface of lower part of the projecting portion of the anode lead member 4. In the present step (and the deburring step to be described later), it is desirable to project laser beams from a plurality of directions. For example, another laser beam source (not shown) is positioned on the other side of the anode lead member 4 opposite to the laser beam source 30. The anode lead member 4 is irradiated with the laser beam 31 from the beam source 30, and thereafter irradiated with another laser beam from the opposite direction (the laser beam source 30 may alternatively be moved to provide the second beam). Incidentally, the dielectric coating 5 and the precoat layer 6 maybe removed mechanically using a file, grinder or the like.

Figure 1D:
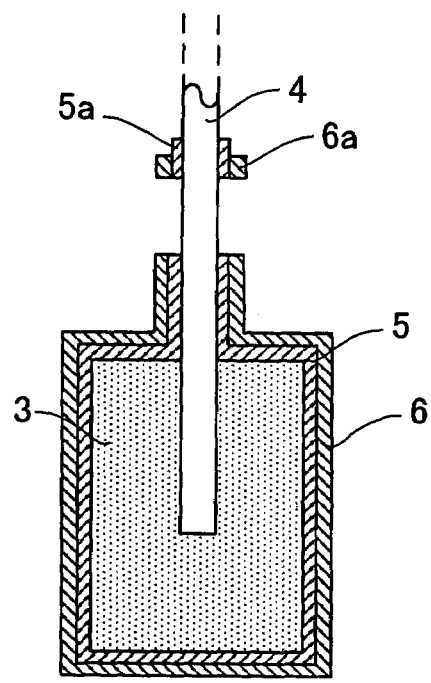
FIG. 1D is a sectional view of the anode body for illustrating the first embodiment of the invention, an area of the surface of lower part of the anode lead member projecting portion being exposed in an annular form.

When the coating 5 and the precoat layer 6 are locally removed, an annular dielectric coating 5a is provided on the surface of lower part of the projecting portion of the anode lead member 4 as seen in FIG. 1D. Furthermore, an annular precoat layer 6a is preferably provided on the coating 5a by adjusting the region where the precoat layer 6 is to be formed or the beam diameter of the laser beam.

Figure 1E:
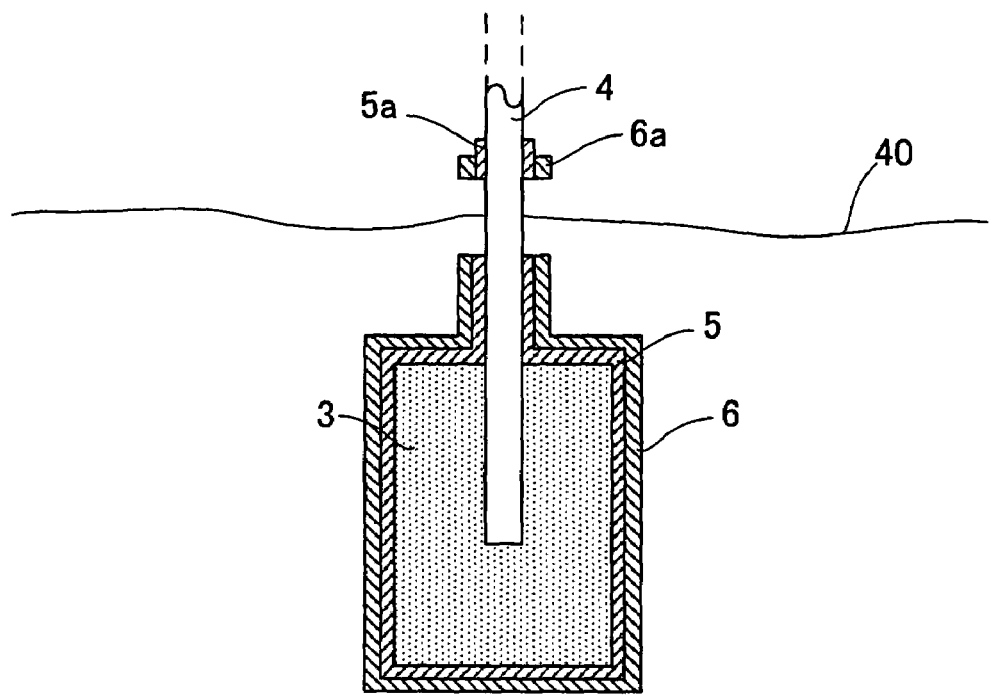
FIG. 1E is a sectional view of the anode body for illustrating the first embodiment of the invention, the view showing the anode body as immersed in a solution for electrolytic polymerization.
Figure 7A:
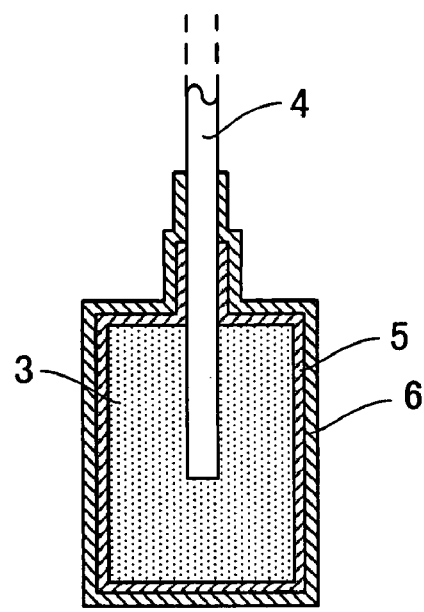
FIG. 7A is a sectional view of an anode body for illustrating another conventional process for fabricating a capacitor element, the view showing a dielectric coating and a precoat layer formed over the anode body.
Figure 7B:
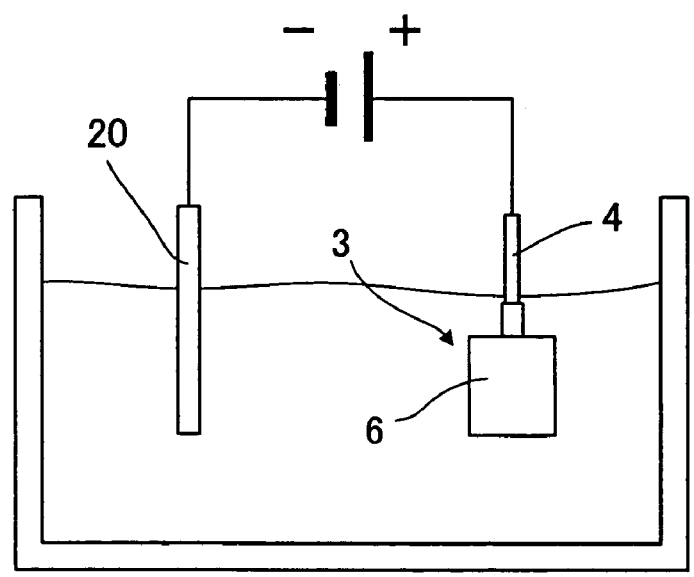
FIG. 7B is a diagram for illustrating the conventional process for fabricating a capacitor element, the diagram showing the step of forming an electrically conductive high polymer layer by electrolytic polymerization.
Figure 7C:
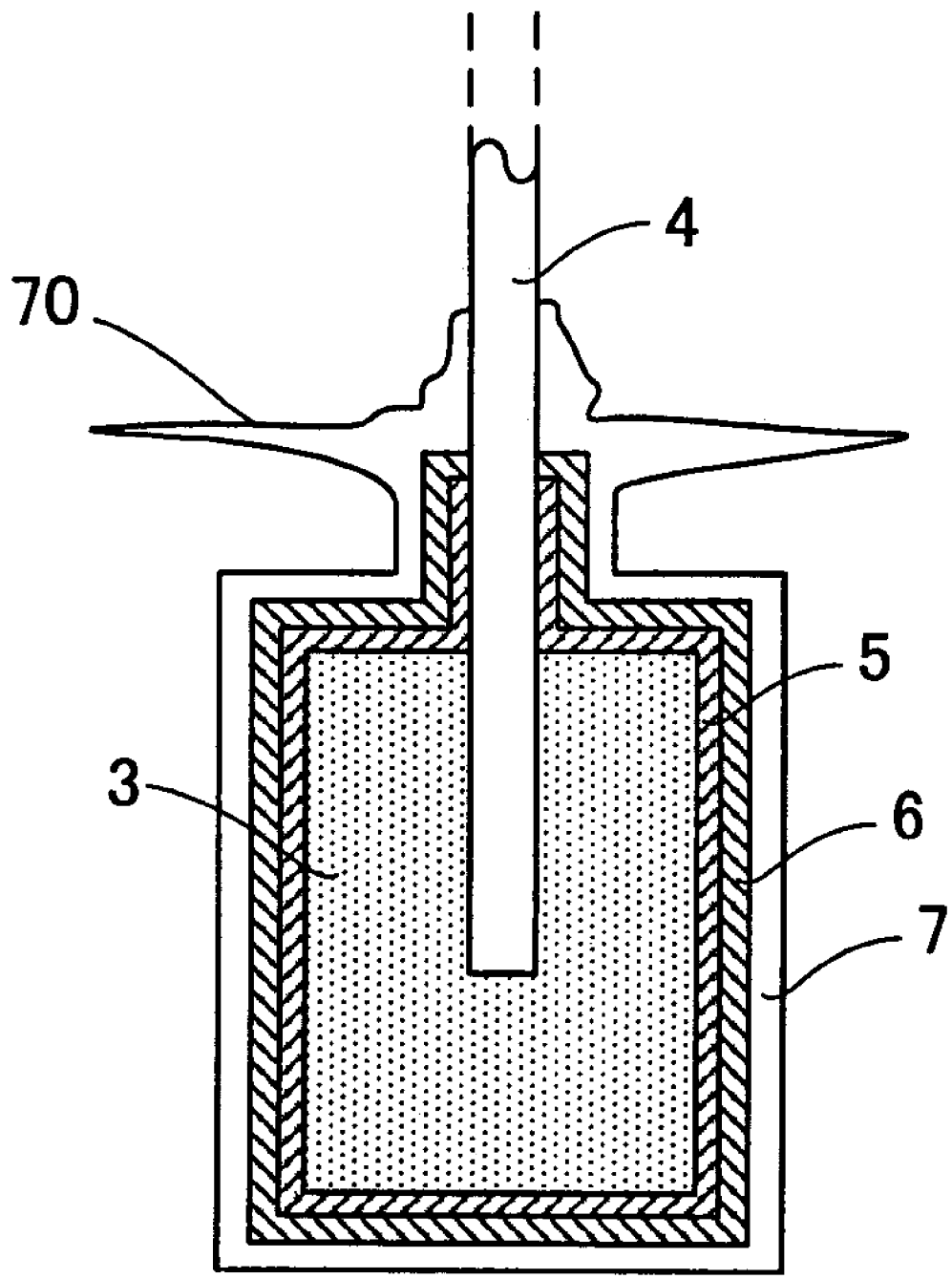
FIG. 7C is a sectional view of the anode body after electrolytic polymerization for illustrating the conventional process for fabricating a capacitor element.

With reference to FIG. 1E, the anode body 3 is subsequently immersed in a solution of a monomer to be polymerized into an electrically conductive high polymer. At this time, the anode body 3 is so positioned that the annular exposed area of the projecting portion of the anode lead member 4 will be positioned at the liquid level 40 of the solution. When the anode body 3 is immersed, voltage is impressed across an electrode plate immersed in the solution and the anode lead member 4 serving as a positive electrode as shown in FIG. 7B. The monomer is electrolytically polymerized to form an electrically conductive high polymer layer on the precoat layer 6. For example, polypyrrole, polyaniline, polythiophene or a derivative of such a polymer is useful for the conductive high polymer layer.

Figure 1F:
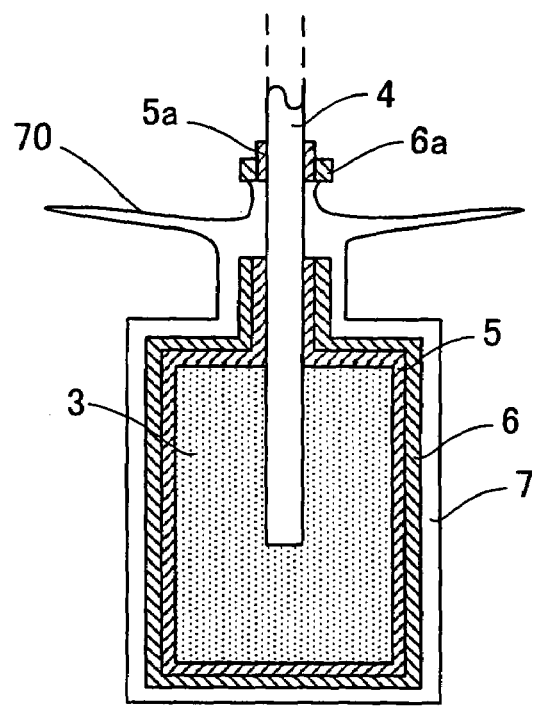
FIG. 1F is a sectional view of the anode body for illustrating the first embodiment of the invention, the view showing the anode body after the completion of electrolytic polymerization.

The application of voltage first forms a conductive high polymer layer on the annular exposed area of the anode lead member 4. The high polymer layer gradually grows, and upon growing to a considerable size, the layer comes into contact with the precoat layer 6, whereby the precoat layer 6 is electrically connected to the anode lead member 4. The conductive high polymer layer 7 is formed over the precoat layer 6 as shown in FIG. 1F.

On the other hand, a burr 70 of conductive high polymer growing along the liquid surface 40 is formed around the annular exposed area of the anode lead member 4. However, the burr 70 is unlikely to form on the annular dielectric coating 5a provided on the upper side of the annular exposed area. According to the present embodiment, therefore, the region where the burr 70 is formed is limited to a lateral region around the annular exposed area of the anode lead member 4. With the annular precoat layer 6a further provided, the ascent of the solution during electrolytic polymerization is blocked by this precoat layer 6a. Thus, the region of burr formation is effectively restricted in the present embodiment.

Figure 1G:
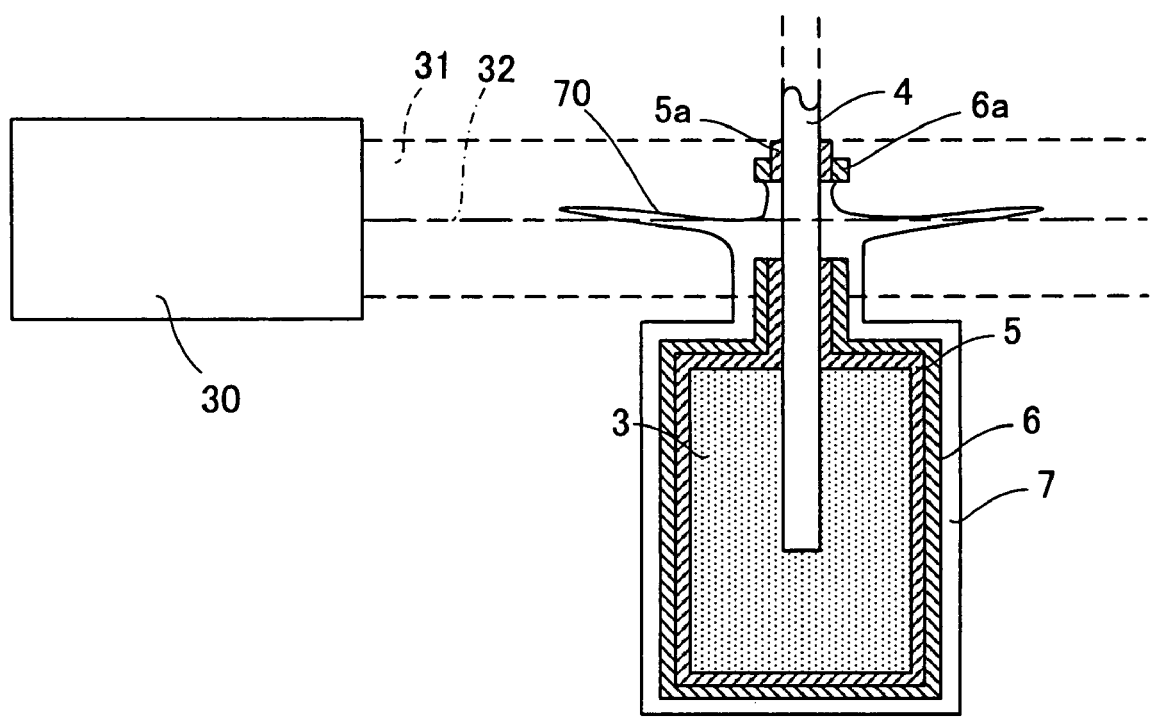
FIG. 1G is a sectional view of the anode body for illustrating the first embodiment of the invention, the view showing the step of removing a burr using a laser beam.

The step of removing the burr 70, i.e., the deburring step, is performed after the conductive high polymer layer 7 is formed over the precoat layer 6. With the region of burr formation restricted as described above, the burr 70 is readily removable by positioning the anode body 3 in the same manner as previously relative to the laser beam source 30 and irradiating the anode body with the laser beam 31. Although the burr 70 is removable using a file or grinder, it is desirable to use the laser beam source 30 as shown in FIG. 1G in order to reliably insulate the lead member 4 from the high polymer layer 7 and the precoat layer 6 electrically. Irradiation with the laser beam 31 not only removes the burr 70 but also produces the benefit that the high polymer layer 7 and the precoat layer 6 in the vicinity of the region of irradiation are made into an insulator with the heat of the beam.

Figure 1H:
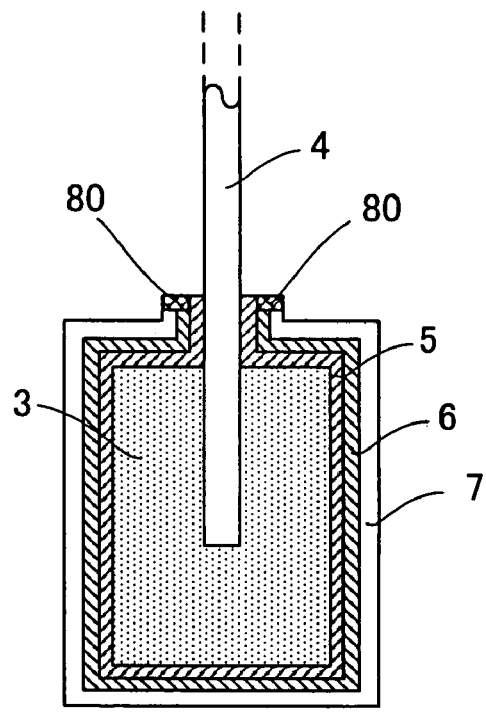
FIG. 1H is a sectional view of the anode body for illustrating the first embodiment of the invention, the view showing that the bar, an annular dielectric coating and annular precoat layer have been removed, and that an insulator portion is formed from a conductive high polymer layer and precoat layer.

Preferably, the laser beam 31 to be used for the deburring step is larger in beam diameter than the laser beam used for the foregoing step of removing the dielectric coating 5 and the precoat layer 6 as shown in FIG. 1G. The annular dielectric coating 5a and precoat layer 6a are then also removable as seen in FIG. 1H (although these coating 5a and layer 6a need not always be removed). Furthermore, the heat generated by the projection of the laser beam 31 produces an insulator portion 80 from the conductive high polymer layer 7 and the precoat layer 6 as shown in FIG. 1H. The insulator portion 80 thus provided ensures more reliable electrical insulation of the anode lead member 4 from the high polymer layer 7 and the precoat layer 6. According to the present embodiment, the anode body 3 is positioned in place relative to the laser beam source 30 as in the step of removing the dielectric coating 5 and the precoat layer 6. Stated more specifically, the anode body 3 is positioned in place relative to the optical axis 32 of the laser beam 31 as in the removing step shown in FIG. 1C. Furthermore, it is to be noted that the laser beam 31 of increased beam diameter is projected as centered about the optical axis 32. With the present embodiment, removal of the burr 70, removal of the dielectric coating 7 and the precoat layer 6 and production of the insulator portion are effected simultaneously by virtue of this arrangement to achieve the efficiency of the fabrication process.

Additionally with the present embodiment, it is desirable that the laser beam 31 to be used for the step of removing the burr 70 be greater in output than the beam to be used for the step of removing the dielectric coating 7 and the precoat layer 6. The coating 6a and the precoat layer 6a may be removed with the laser beam 31 as shifted in position for irradiation.

Figure 2:
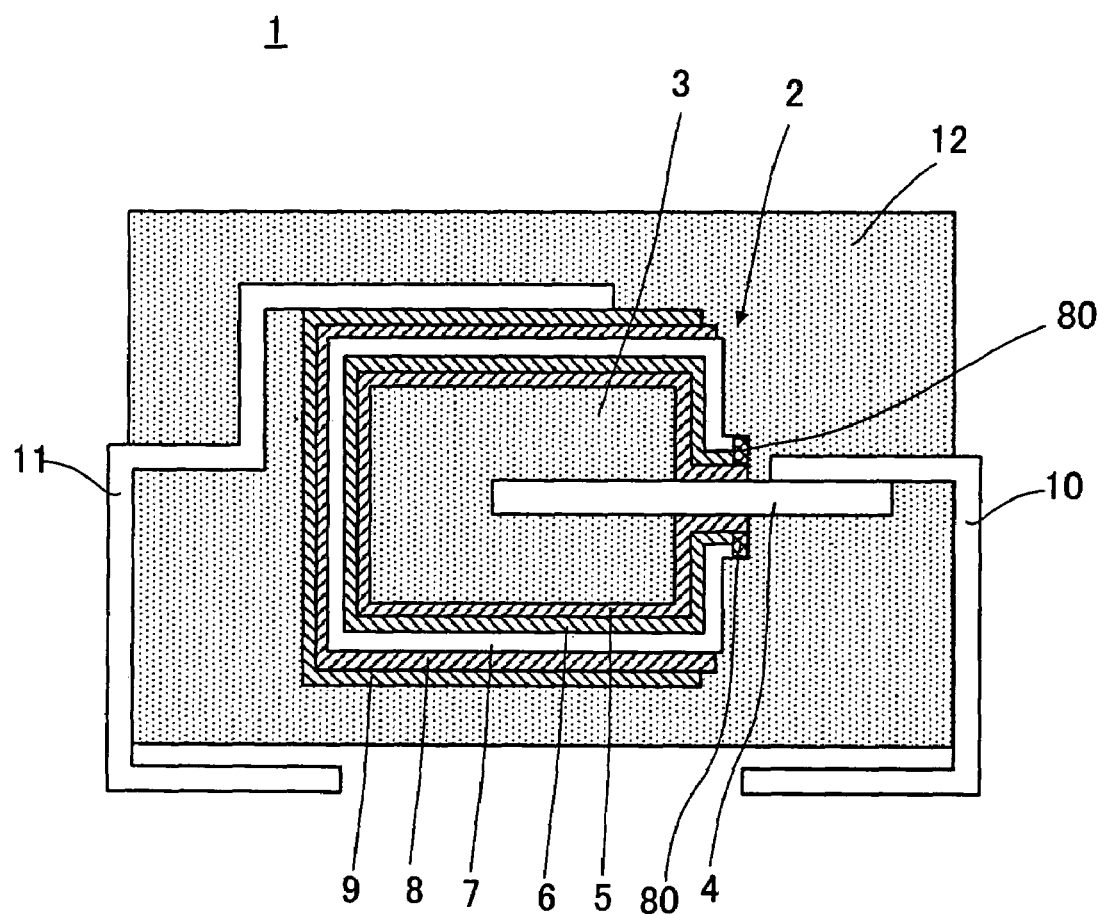
FIG. 2 is a sectional view of a solid electrolytic capacitor of the chip type including the capacitor element fabricated by the first embodiment of the invention.

After the removal of the burr 70 and the conversion to the insulator portion, the step of cleaning and drying the anode body 3 shown in FIG. 1H is performed, followed by the step of forming a carbon layer 8 and then a silver layer 9 over the conductive high polymer layer 7 and by the step of adjusting the length of the projecting portion of the anode lead member 4 to complete the capacitor element 2 (see FIG. 2). Thereafter performed are the step of connecting an anode terminal 10 and a cathode terminal 11, each in the form of a flat plate, to the capacitor element 2, and the step of forming a generally rectangular resin package 12 using an epoxy resin or the like. Further performed are the step of bending the anode terminal 10 and the cathode terminal 11, and an aging step to complete the solid electrolytic capacitor 1 of the chip type shown in FIG. 2.

[Second Embodiment]

Figure 3A:
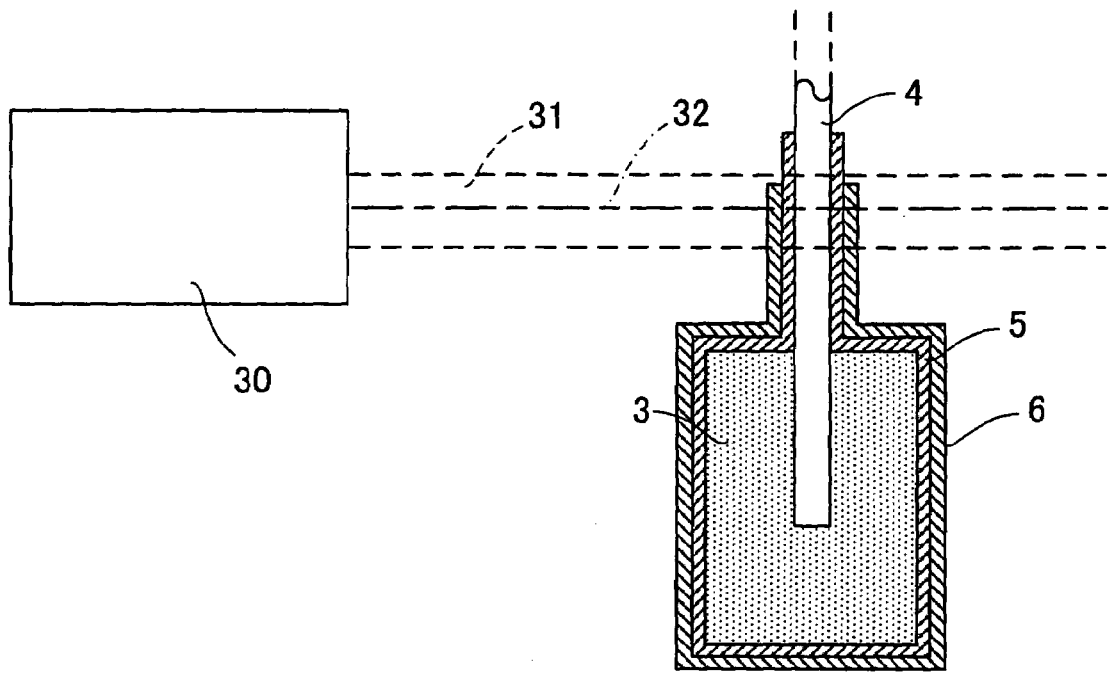
FIG. 3A is a sectional view of an anode body for illustrating as a second embodiment of the invention a process for fabricating a capacitor element, the view showing the step of partly removing a dielectric coating and a precoat layer with a laser beam.
Figure 3B:
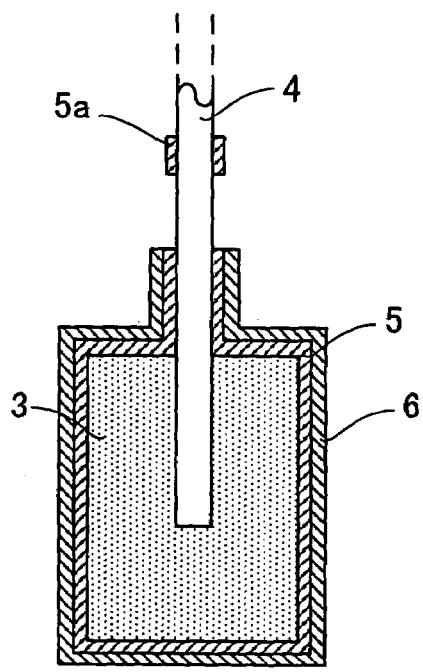
FIG. 3B is a sectional view of the anode body for illustrating the second embodiment of the invention, an area of the surface of lower part of the anode lead member projecting portion being exposed in an annular form.

A second embodiment of the invention will be described next. Like the first embodiment, the second embodiment also includes the step of forming a dielectric coating 5 on an anode body 3 (and on the surface of lower part of a projecting portion of an anode lead member 4), and the step of forming a precoat layer 6. Further included is the step of locally exposing the surface of lower part of the projecting portion of the anode lead member 4 in an annular form as shown in FIG. 3B by partly removing the dielectric coating 5 and the precoat layer using a laser beam source 30 as shown in FIG. 3A. According to the second embodiment, the annular precoat layer of the first embodiment is not provided on an annular dielectric coating 5a by adjusting the region where the precoat layer 6 is to be formed or the beam diameter of the laser beam 31. Even if such an annular precoat layer is provided, no problem arises if no burr is consequently formed.

Figure 3C:
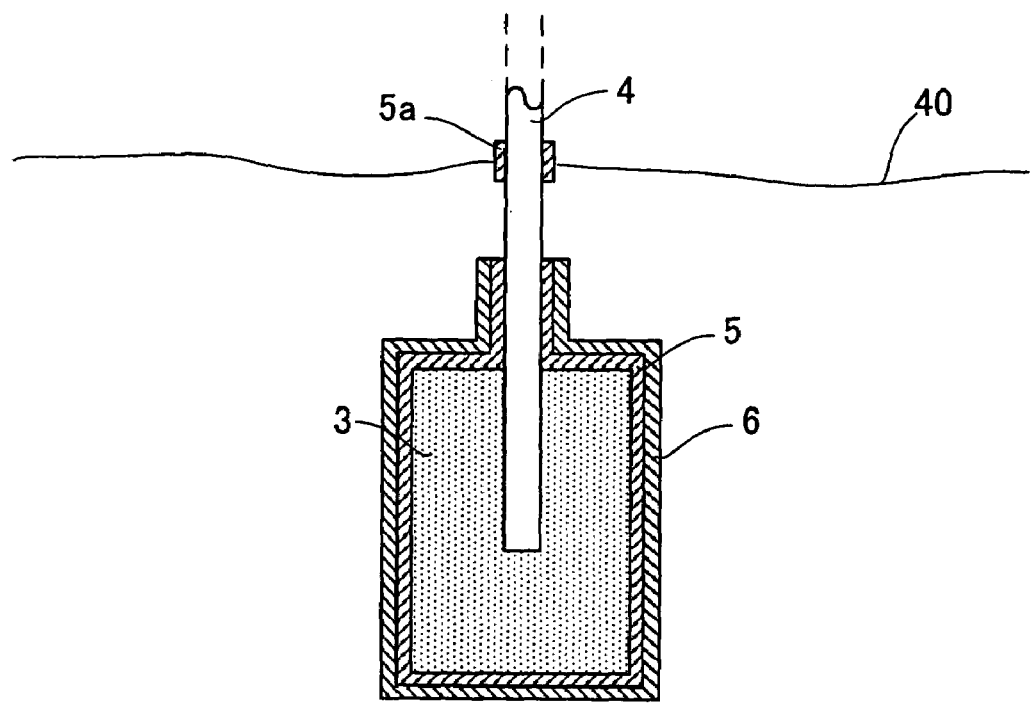
FIG. 3C is a sectional view of the anode body for illustrating the second embodiment of the invention, the view showing the anode body as immersed in a solution for electrolytic polymerization.

Next, the anode body 3 is immersed in a solution of a monomer for making a conductive high polymer as shown in FIG. 3C. At this time, the anode body 3 is so positioned that the annular dielectric coating 5a on the lead member 4 will be positioned at the liquid level 40 of the solution. Voltage is then impressed for electrolytic polymerization across an electrode plate immersed in the solution and the anode lead member 4 as seen in FIG. 7B.

Figure 3D:
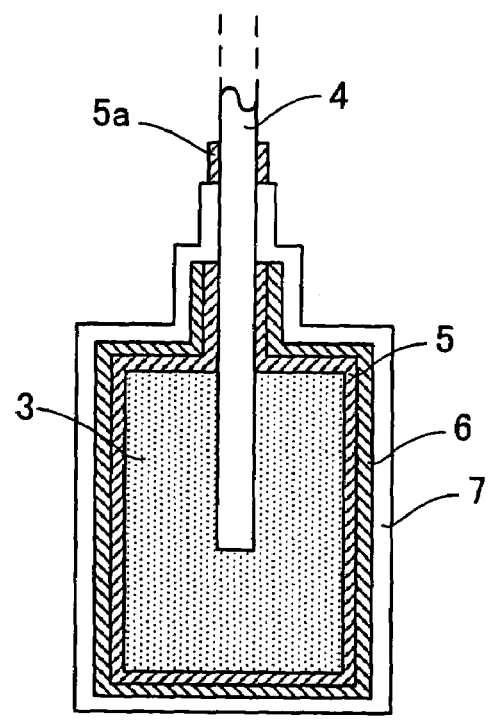
FIG. 3D is a sectional view of the anode body for illustrating the second embodiment of the invention, the view showing the anode body after the completion of electrolytic polymerization.

As is the case with the first embodiment, the application of voltage first forms an electrically conductive high polymer layer 7 on the annular exposed area of the anode lead member 4. When the layer grows to a large size and comes into contact with the precoat layer 6, the high polymer layer 7 is so formed as to cover the precoat layer 6 as shown in FIG. 3D. With the second embodiment, the high polymer layer 7 is formed under the liquid level 40 of the solution. Accordingly, a burr formed in the first embodiment and extending laterally around the lead member 4 is not formed on the annular exposed area thereof.

Subsequently performed is the step of removing the conductive high polymer layer 7 at least from the annular exposed area of the lead member 4. This step can be easily performed by positioning the anode body 3 relative to the laser beam source 30 and irradiating the anode body with the laser beam 31 as in the step of removing the dielectric coating 5 and the precoat layer 6 shown in FIG. 3A. Although this step can be performed by using a file or grinder, it is desirable to use the laser beam 31. Further as in the first embodiment, it is desirable to make the laser beam to be used in the step of partly removing the high polymer layer 7 greater in the beam diameter and/or the output than the laser beam to be used in the step of removing the dielectric coating 5 and the precoat layer 6. The step of removing the conductive high polymer layer 7 is followed by the sequence of steps described with reference to the first embodiment, whereby the capacitor element 2 is completed to further complete the solid electrolytic capacitor 1 shown in FIG. 2.

[Third Embodiment]

Figure 4A:
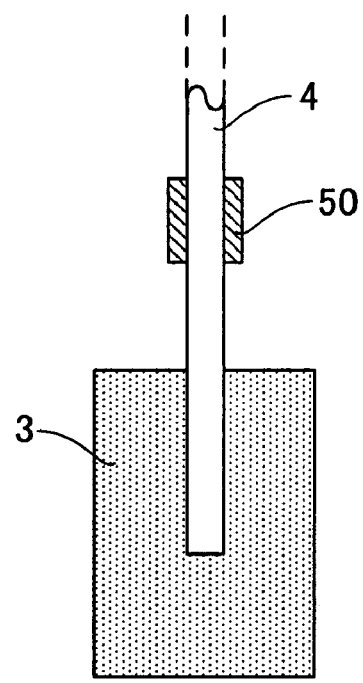
FIG. 4A is a sectional view of an anode body for illustrating as a third embodiment of the invention, i.e., a process for fabricating a capacitor element, the view showing an annular covering member provided on a projecting portion of an anode lead member.

A third embodiment of the invention will be described next. With the third embodiment, an annular covering member 50 of insulating material is provided at a lower part of a projecting portion of an anode lead member 4 as shown in FIG. 4A. An annular sleeve is used as the covering member 50 in the present embodiment, while the covering member 50 may be a strip wound around the lead member 4.

Figure 4B:
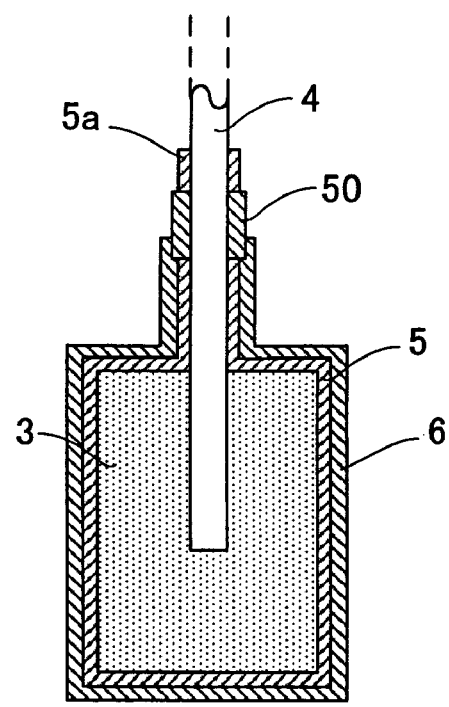
FIG. 4B is a sectional view of the anode body for illustrating the third embodiment of the invention, the view showing a dielectric coating and a precoat layer formed on the coating.
Figure 5:
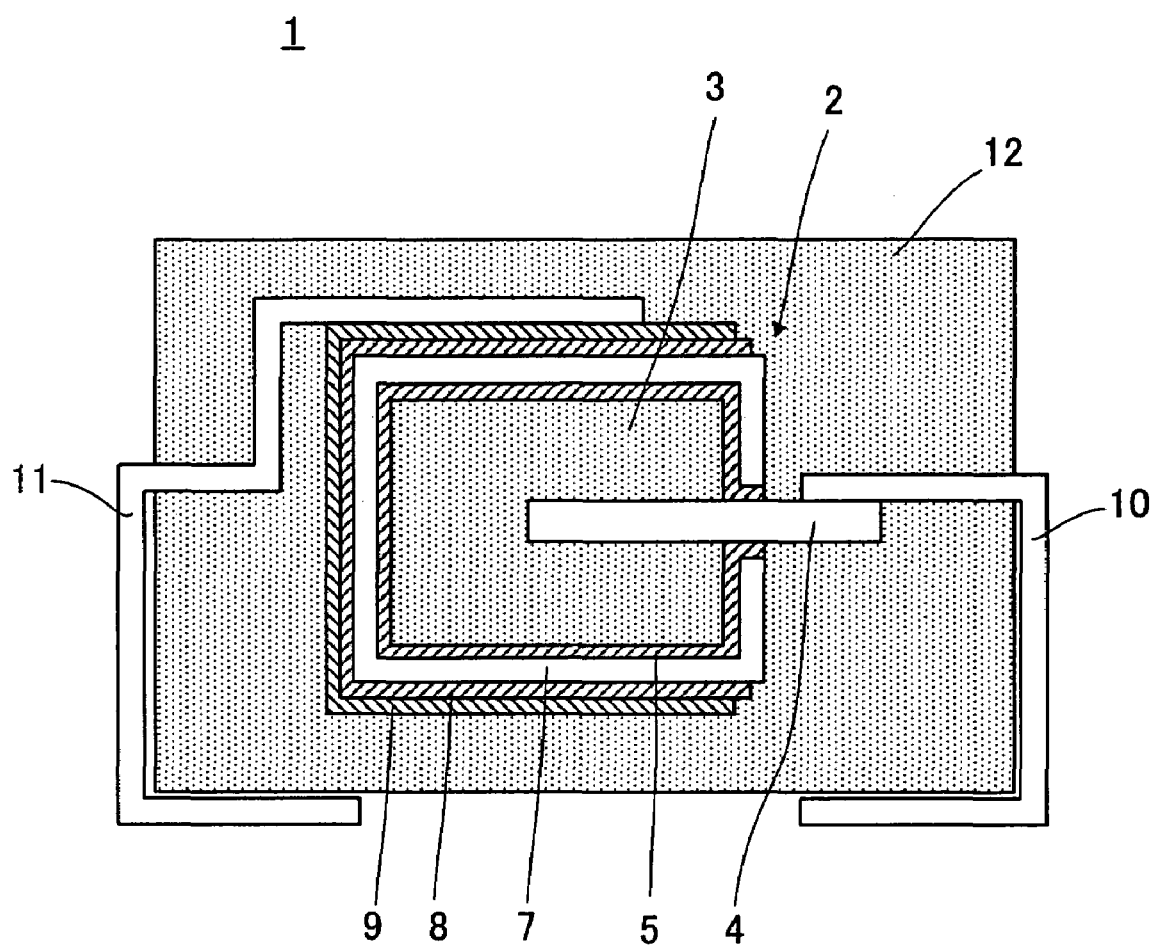
FIG. 5 is a sectional view showing a conventional solid electrolytic capacitor of the chip type.
Figure 6A:
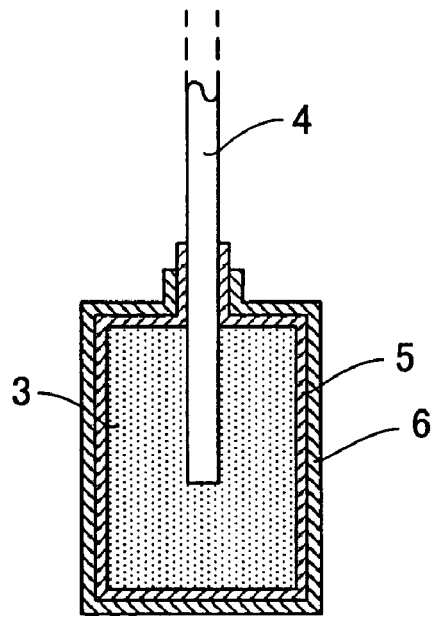
FIG. 6A is a sectional view of an anode body for illustrating a conventional process for fabricating a capacitor element, the view showing a dielectric coating and a precoat layer formed over the anode body.
Figure 6B:
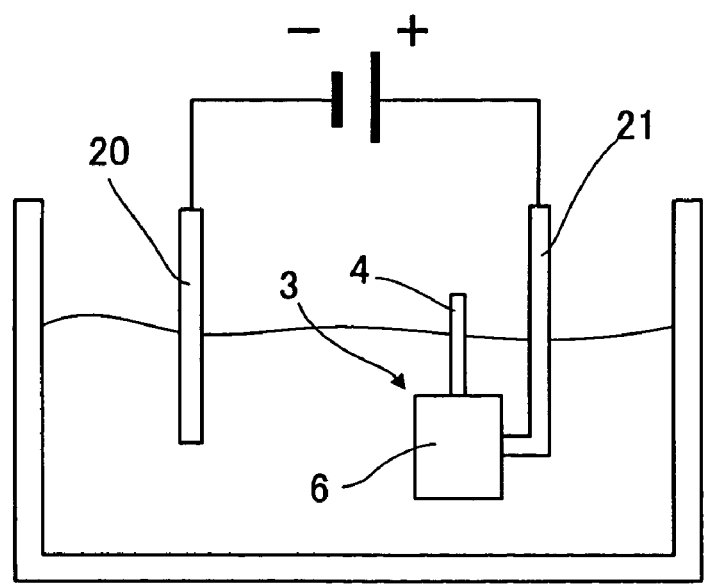
FIG. 6B is a diagram for illustrating the conventional process for fabricating a capacitor element, the diagram showing the step of forming an electrically conductive high polymer layer by electrolytic polymerization.

After the covering member 50 is provided, the anode body 3 is treated to form a dielectric coating 5 and further treated to form a precoat layer 6 as seen in FIG. 4B. The coating 5 is formed on the surface of the anode body 3 and also on the surface of the anode lead member 4 under the covering member 50. An annular dielectric coating 5a is further formed on the surface of the lead member 4 on the upper side of the covering member 50. In the step of forming the precoat layer 6, the anode body 3 is positioned for chemical polymerization so that the side portion of the covering member 50 is positioned at the liquid level of the solution. As shown in FIG. 4B, therefore, the precoat layer 6 is not formed on the annular dielectric coating 5a.

After the step of forming the precoat layer 6, the step of exposing an area of the projecting portion of the anode lead member 4 in an annular form is performed by removing the covering member 50 (and the precoat layer 6 thereon). Preferably, this step is performed using a laser beam as in the previous embodiments, whereas a file or the like may be used. In the case where the covering member 50 is a strip, this step can be performed by removing the strip winding from the anode lead member 4. As in the second embodiment, thereafter performed are the step of forming a conductive high polymer layer 7, the step of partly removing the polymer layer 7, etc. to complete a capacitor element 2 and further complete the solid electrolytic capacitor 1 shown in FIG. 2.

In the third embodiment, the anode body 3 may be positioned for electrolytic polymerization so that the annular exposed area of the anode lead member 4 resulting from the removal of the covering member 50 will be positioned at the liquid level of the solution. The burr then formed is removed in the same manner as in the first embodiment.

The embodiments described above are intended for the illustration of the present invention and should not be construed as limiting the invention set forth in the appended claims or reducing the scope thereof. The steps of the present invention are of course not limited to those of the foregoing embodiments but can be modified variously within the technical scope defined in the claims.

What is claimed is:

1. A process for fabricating a capacitor element including the steps of:

forming a dielectric coating on a surface of an anode body and a surface of lower part of a projecting portion of an anode lead member implanted in the anode body, forming a precoat layer of an electrically conductive high polymer on the dielectric coating, exposing an area of the surface of the lower part in an annular form by partly removing the dielectric coating and the precoat layer, forming an electrically conductive high polymer layer on the precoat layer using an electrolytic polymerization process by immersing the anode body in a solution of a monomer so as to position said area of the surface of the lower part at the liquid level of the solution, and deburring the conductive high polymer formed on said area of the surface of the lower part.

2. A process for fabricating a capacitor element according to claim 1 wherein in the exposing step, an annular dielectric coating is formed above said area of the surface of the lower part, and an annular precoat layer is formed on the annular dielectric coating.

3. A process for fabricating a capacitor element according to claim 1 wherein the exposing step is performed by irradiating the anode lead member with a laser beam.

4. A process for fabricating a capacitor element according to claim 1 wherein the deburring step is performed by irradiating the anode lead member with a laser beam.

5. A process for fabricating a capacitor element according to claim 3 wherein the deburring step is performed by irradiating the anode lead member with a laser beam.

6. A process for fabricating a capacitor element according to claim 5 wherein the deburring step is performed by irradiating the anode lead member with a laser beam having a larger beam diameter than the laser beam used for the exposing step.

7. A process for fabricating a capacitor element including the steps of:

forming a dielectric coating on a surface of an anode body and a surface of lower part of a projecting portion of an anode lead member implanted in the anode body, forming a precoat layer of an electrically conductive high polymer on the dielectric coating, exposing an area of the surface of the lower part in an annular form by partly removing the dielectric coating and the precoat layer so as to provide an annular dielectric coating, forming an electrically conductive high polymer layer on the precoat layer using an electrolytic polymerization process by immersing the anode body in a solution of a monomer so as to position the annular dielectric coating at the liquid level of the solution, and removing a portion of the conductive high polymer layer formed on said area of the surface of the lower part.

8. A process for fabricating a capacitor element according to claim 7 wherein the exposing step is performed by irradiating the anode lead member with a laser beam.

9. A process for fabricating a capacitor element according to claim 7 wherein the conductive high polymer layer removing step is performed by irradiating the anode lead member with a laser beam.

10. A process for fabricating a capacitor element according to claim 8 wherein the conductive high polymer layer removing step is performed by irradiating the anode lead member with a laser beam.

11. A process for fabricating a capacitor element according to claim 10 wherein the conductive high polymer layer removing step is performed by irradiating the anode lead member with a laser beam having a larger beam diameter than the laser beam used for the exposing step.

12. A process for fabricating a capacitor element including the steps of:
   providing an annular covering member on a surface of lower part of a projecting portion of an anode lead member implanted in an anode body,
   forming a dielectric coating on a surface of the anode body and forming a dielectric coating on the surface of the lower part of the projecting portion above and under the covering member,
   forming a precoat layer of an electrically conductive high polymer so as to cover at least the dielectric coating formed on the surface of the anode body,
   exposing an area of the surface of the lower part of the projecting portion in an annular form by removing the covering member,
   forming an electrically conductive high polymer layer on the precoat layer using an electrolytic polymerization process by immersing the anode body in a solution of a monomer so that the dielectric coating in an annular form and located above the covering member before the removal thereof is positioned at the liquid level of the solution, and
   removing a portion of the conductive high polymer layer formed on said area of the surface of the lower part.

13. A process for fabricating a capacitor element according to claim 12 wherein the exposing step is performed by irradiating the anode lead member with a laser beam.

14. A process for fabricating a capacitor element according to claim 12 wherein the conductive high polymer layer removing step is performed by irradiating the anode lead member with a laser beam.

15. A process for fabricating a capacitor element according to claim 13 wherein the conductive high polymer layer removing step is performed by irradiating the anode lead member with a laser beam.

16. A process for fabricating a capacitor element according to claim 15 wherein the conductive high polymer layer removing step is performed by irradiating the anode lead member with a laser beam having a larger beam diameter than the laser beam used for the exposing step.

* * * * *